(12) United States Patent
Virtanen

(10) Patent No.: US 6,769,297 B2
(45) Date of Patent: Aug. 3, 2004

(54) METHOD AND EQUIPMENT FOR MEASURING TENSION OF MOVING WEB

(75) Inventor: Jorma Virtanen, Tampere (FI)

(73) Assignee: Metso Automation Oy, Helsinki (FI)

( * ) Notice: Subject to any disclaimer, the term of this patent is extended or adjusted under 35 U.S.C. 154(b) by 42 days.

(21) Appl. No.: 10/323,393

(22) Filed: Dec. 18, 2002

(65) Prior Publication Data

US 2003/0115766 A1 Jun. 26, 2003

(30) Foreign Application Priority Data

Dec. 19, 2001 (FI) ............................................. 20012518

(51) Int. Cl.$^7$ ................................................ G01L 5/08
(52) U.S. Cl. ......................................... 73/159; 73/37.7
(58) Field of Search .................. 73/37.7, 159, 862.391, 73/862.451, 862.453, 862.454, 862.046, 862.07

(56) References Cited

U.S. PATENT DOCUMENTS 3,718,037 A * 2/1973 Stringer et al. ........ 73/862.454
5,052,233 A * 10/1991 Rantala .................. 73/862.454

* cited by examiner

Primary Examiner—Robert Raevis
(74) Attorney, Agent, or Firm—Alston & Bird LLP

(57) ABSTRACT

A method and equipment for measuring the tension of a moving web. The tension of the moving web is measured by means of a measuring element provided with a guide surface which the moving web is guided to pass such that the web forms an air cushion of the air it carries between the web and the guide surface. Measuring devices are arranged at a distance from one another in connection with the measuring element in the cross direction of the web for measuring a variable representing the tension of the moving web. The measuring element is moved back and forth in the cross direction of the web such that the tension profile of the web is measured at least on a part of the web width by means of the measuring devices arranged in connection with the measuring element.

18 Claims, 2 Drawing Sheets

METHOD AND EQUIPMENT FOR MEASURING TENSION OF MOVING WEB

BACKGROUND OF THE INVENTION

1) Field of the Invention

The invention relates to a method for measuring the tension of a moving web, in which method the tension of the moving web is measured by means of a measuring element provided with a guide surface which the moving web is guided to pass such that the web forms an air cushion of the air it carries between the web and the guide surface and in which method a variable representing the tension of the moving web is measured by means of measuring devices arranged in connection with the measuring element, at a distance from one another in the cross direction of the web.

The invention further relates to equipment for measuring the tension of a moving web, which equipment comprises a measuring element provided with a guide surface which the moving web is arranged to pass such that the moving web forms an air cushion of the air it carries between the web and the guide surface and which equipment further comprises measuring devices arranged in connection with the measuring element, at a distance from one another in the cross direction of the web for measuring a variable representing the tension of the moving web.

2) Description of Related Art

A finished paper web formed in paper manufacture is rolled at several stages of the process both in the paper machine and in after-treatment units or finishing systems. The paper produced in a paper machine, for example, is rolled at the end of the process in a reeler into large machine rolls of even several meters in diameter. Web tension which is too low may cause fluttering or bag-like hanging of the web, which may further lead to accumulation and even breaking of the web. Also web tension which is too high causes web breaks, even in the middle of steady run, and therefore the right tension is found between these two extremes. In a paper machine the tension applied to the web is adjusted by changing the differences in speed between the different operational groups of the machine. These different operational groups include a wire section, a press section, a drier section, which is typically divided further into several different operational groups, a calender, and a reeler.

Web tension has conventionally been measured using guide rolls provided with weighing sensors. A problem with this solution is, however, that in the measurement there is always a contact with the web, whereby the measurement may leave marks on the web or cause other damage to it. Further problems include the crawl of the zero point of the measurement and the sensitivity of the measurement to temperature variations and vibration.

The tension of a moving web is currently measured by means of a tension measuring beam having a measuring bar provided with a curved guide surface. When the moving web is guided to pass the guide surface, the air carried by the web forms an air cushion between the web and the guide surface, the pressure of the air cushion being proportional to the tension of the web. On the guide surface of the measuring bar, in the cross direction of the web and in the longitudinal direction of the tension measuring beam, there are measurement orifices into which pressure hoses are fitted through which the pressure of the air cushion between the moving web and the measuring bar is supplied into a measurement cabinet arranged in the vicinity of the measuring beam. The measurement cabinet comprises pressure sensors for determining the pressure at a measurement point corresponding to each pressure hose. Since the tension of the web is proportional to the pressure of the air cushion between the web and the measuring bar, the tension of the web can be determined at the measurement orifices on the basis of the measured pressure. Publication FI80522 discloses a solution of the above type for measuring the tension of a moving web.

A weakness in solutions relying on a tension measuring beam is that they allow the tension of a moving web to be only determined at those points in the cross direction of the web where the measuring devices arranged to the measuring bar for measuring the pressure of the air cushion are placed. Since the tension profile of the web cannot be measured either on the entire width of the web or even on a part of the width of the web, errors may appear in the measurement results and therefore the tension applied to the web cannot be adjusted with sufficient precision to optimise the runnability of the web. The resolution of the web tension measurement can naturally be improved by adding more measuring devices to the measuring bar for measuring a variable representing the web tension. However a problem arises here from the need for space for the measuring devices in the measuring bar and the considerable increase in the costs of purchasing and mounting the measuring devices.

It is an object of the present invention to provide a new solution for measuring web tension.

BRIEF SUMMARY OF THE INVENTION

The method of the invention is characterized by: moving the measuring element back and forth in the cross direction of the web such that the tension profile of the web is measured at least on a part of the web width by means of the measuring devices arranged in connection with the measuring element.

The equipment of the invention, in turn, is characterized in that the equipment further comprises a device which is arranged to move the measuring element back and forth in the cross direction of the web such that the tension profile of the web is arranged to be measured at least on a part of the web width by means of the measuring devices arranged in connection with the measuring element.

The basic idea of the invention is to measure the tension of the moving web by means of a measuring element provided with a guide surface which the moving web is guided to pass such that the web forms an air cushion of the air it carries between the web and the guide surface, the measuring element comprising measuring devices arranged at a distance from one another in the cross direction of the web for measuring a variable representing the tension of the moving web. A further basic idea of the invention is that the measuring element is moved back and forth in the cross direction of the web such that the profile of the variable representing the tension of the web is measured at least on a part of the web width by means of the measuring devices arranged in connection with the measuring element. According to an embodiment of the invention, the measuring element is moved back and forth in the cross direction of the web such that the profile of the variable representing the tension of the web is measured on the entire width of the web by means of the measuring devices arranged in connection with the measuring element. According to a second embodiment of the invention, the measuring element is a tension measuring beam having a frame and a measuring bar, the measuring bar being provided with a guide surface facing the surface of the web. According to a third embodiment of the invention, the position of the measuring element is measured relative to supports of the measuring element. According to a fourth embodiment of the invention, the variable representing the tension of the web is the pressure of the air cushion between the web and the guide surface of the measuring element.

An advantage of the invention is that by moving the measuring element back and forth in the cross direction of the web, the tension profile of the moving web can be determined with accuracy at least on the part of the web width, or on the entire web width, without a need to increase the number of measuring devices arranged to the measuring element. When the measuring element that is moved back and forth is the measuring beam, the solution can be implemented with extremely small changes in the structure of the tension measuring beam and the related supports and measuring devices and the control and data processing units involved. When the position of the measuring element is measured in relation to the supports, each measurement data element representing web tension can be focused with precision on a specific point in the cross direction of the web. A preferred variable for the web tension is the pressure of the air cushion between the web and the guide surface of the measuring element, because then even very small changes in the web tension can be easily detected as changes in the air cushion pressure.

In this specification, the term 'paper' covers not only paper but also paperboard and tissue.

BRIEF DESCRIPTION OF THE SEVERAL VIEWS OF THE DRAWINGS

The invention will be discussed in greater detail in connection with the following drawings, in which.

DETAILED DESCRIPTION OF THE INVENTION

Figure 1:
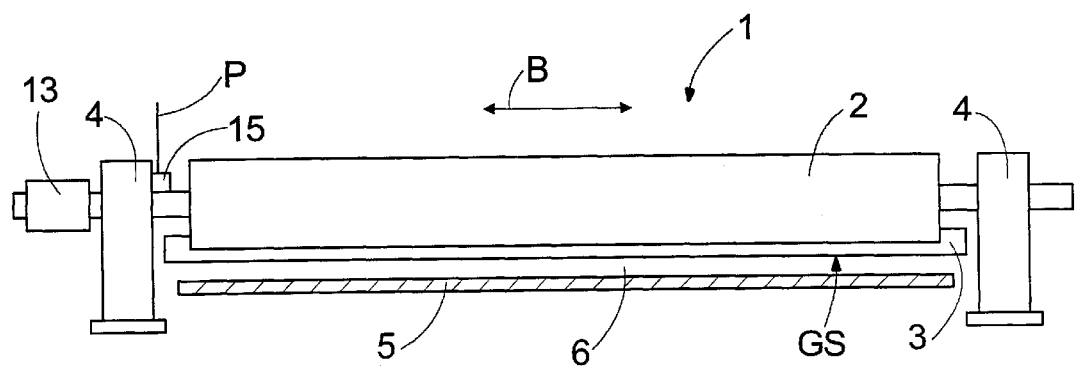
FIG. 1 is a schematic, partly cross-sectional front view of a solution according to the invention.
Figure 2:
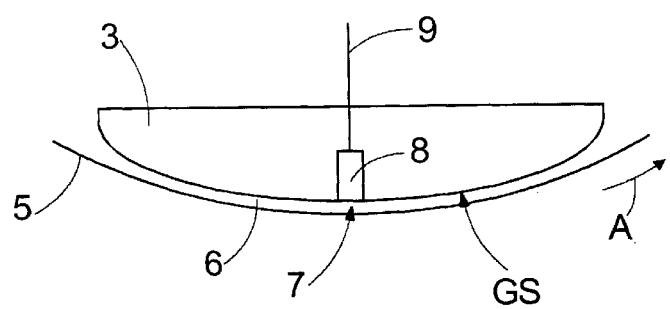
FIG. 2 is a schematic, cross-sectional side view of a measuring bar.
Figure 3:
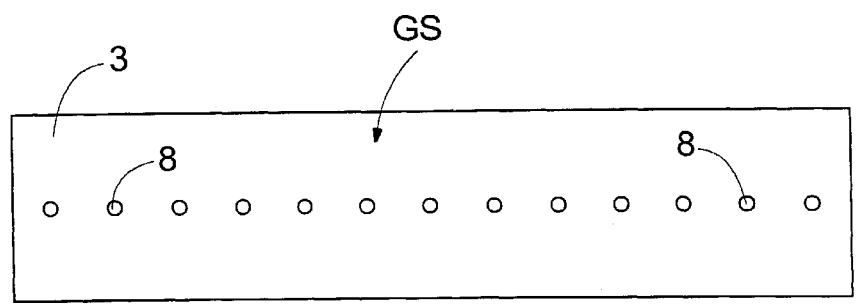
FIG. 3 is a schematic view of the measuring bar of FIG. 2, seen from the direction of the web.
Figure 4:
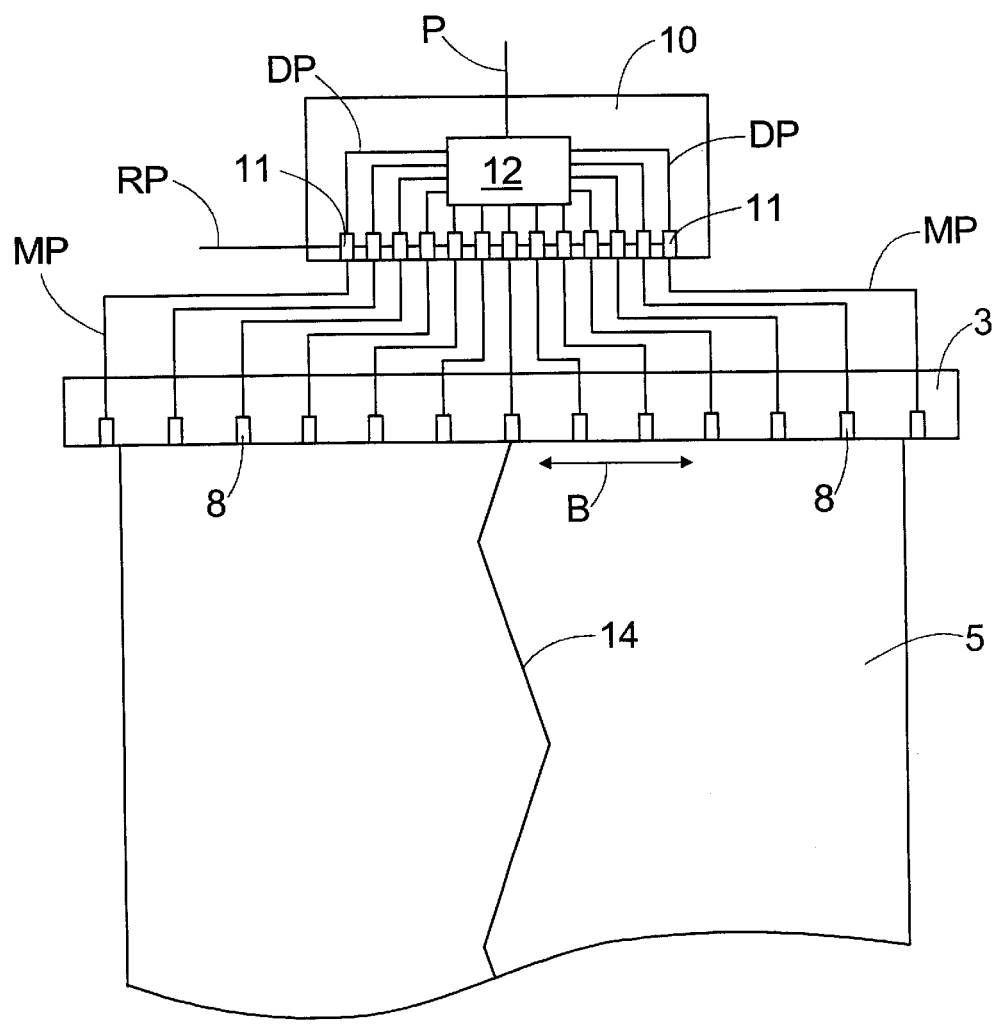
FIG. 4 is a schematic front view, seen diagonally from above, of the solution of the invention.

FIG. 1 is a schematic, partly cross-sectional front view of a solution according to the invention for measuring the tension profile of a moving web 5 either on the entire width of the web 5 or at least on a part of the web 5 width. FIG. 1 shows a tension measuring beam 1 comprising a frame 2 and a measuring bar 3 or an orifice plate 3 supported to the frame. The tension measuring beam 1 is supported to supports 4, which are used for supporting the tension measuring beam 1 to the frame of a paper machine or some other web processing apparatus, or to the immediate vicinity thereof, for example to the floor of a paper mill. For the sake of clarity, the paper machine or other web processing apparatus in which the tension measuring beam 1 can be used is not shown in the Figure. FIG. 2 shows a schematic, cross-sectional side view of the measuring bar 3, and in FIG. 3 it is shown schematically as seen from the web 5. In FIGS. 1, 2 and 4 the tension measuring beam 1 is arranged such that the web 5 runs under the measuring bar 3, in the direction shown by arrow A. However, the tension measuring beam 1 can be arranged in a number of different positions where the web 5 can be guided to pass a guide surface GS of the measuring bar 3 to measure the tension of the web 5. The tension measuring beam 1 may thus be placed for example such that the web 5 runs in a vertical direction over the measuring bar 3 or alongside of the measuring bar 3. The tension measuring beam 1 is used particularly in paper machines for measuring the tension of a moving paper web, although the tension measuring beam 1 can also be used for example for measuring the tension of a plastic or metal web. In paper machines the tension measuring beam 1 is usually arranged before the reeler, but, depending on the space available, the tension measuring beam 1 may be arranged at any locations where the web 5 runs without support to the wire or felt of the machine. For the sake of clarity, the moving web 5 is shown in FIG. 1 to be substantially thicker, compared with the structure of the tension measuring beam 1, than what it is in reality.

The measuring bar 3 is made of a wear-resistant material, such as aluminium or steel, and it extends in a substantially uniform form across the entire web 5. Instead of a single, uniform structure, the measuring bar 3 may also be made of several, contiguously arranged parts or modules that are substantially alike. The guide surface GS of the measuring bar 3 that faces the web 5 is curved. The radius of curvature of the guide surface GS may vary between 20 centimetres and one metre, for example. The guide surface GS may also be formed of a surface having two or more centers of curvature, of some other suitable curved surface or such that the front edge of the measuring bar 3 is a straight line at a suitable angle to the web 5 and the trailing edge of the measuring bar 3 is in the shape of a circular arc. Because of the arc shape the air carried by the web 5 is pressed between the measuring bar 3 and the web 5 such that between the guide surface GS of the measuring bar 3 and the web 5 there is formed an air cushion 6 supporting the web 5 and keeping it apart from the measuring bar 3.

On the basis of the pressure of the air cushion 6 between the web 5 and the measuring bar 3, the tension of the web 5 can be determined. The guide surface GS of the measuring bar 3 is provided with measurement orifices 7 arranged at a distance from one another in the longitudinal direction of the measuring bar 3, i.e. in the cross direction of the web 5. In connection with the measurement orifices 7, there are provided hose couplings 8 and pressure hoses 9. A measured pressure MP of the air cushion 6 is transferred on the pressure hoses 9 outside the tension measuring beam 1 to a measuring cabinet 10 located in its immediate vicinity, as shown schematically in FIG. 4. On the basis of the measured pressure MP of the air cushion 6 and a reference pressure RP, pressure sensors 11 determine a pressure difference DP, which a control and data processing unit 12 arranged in the measurement cabinet 10 uses for determining the tension of the web 5 at each measurement orifice 7.

The measurement orifices 7 are usually about 2 mm in diameter and the distance between their center points is about 100 mm, although both the diameter of the measurement orifices 7 and their distance from one another may vary. Typically the distance between the measurement orifices 7 varies between 10 and 300 mm. FIG. 3 shows only a few measurement orifices 7, but it is obvious that a measuring bar 3 of a tension measuring beam 1 arranged in a broad paper machine may include even several hundreds of measurement orifices 7.

Since the tension of the web 5 can only be determined at the measuring devices arranged to the measuring bar 3, the resolution of the tension measurement provided in the cross direction of the web 5 is not always sufficient to allow the tension of the web 5 to be adjusted with sufficient precision in all operational circumstances by controlling the speeds of the operational groups of the paper machine, or other web processing unit, such that the web 5 is made to move in an optimal manner in the machine, taking into account both the runnability of the machine and the quality of the finished web 5. As already stated above, the resolution of the tension measurement could be improved in the cross direction of the web 5 by increasing the number of measuring devices to be arranged to the measuring bar 3. However, the number of measuring devices in the measuring bar 3 cannot be increased infinitely due to the space needed by the measuring devices in the measuring bar 3 and the costs arising from the purchase, installation and servicing of the measuring devices.

In the solution of the invention for measuring the tension profile of the web 5 either on the entire width of the web 5 or at least on a part of the web 5 width, the tension measuring beam 1, together with the measuring bar 3 are arranged to be moved back and forth, i.e. to be oscillated, in the cross direction of the web 5, as shown by arrow B. The tension measuring beam 1 is supported by bearings to the supports 4 such that the tension measuring beam 1 can be moved back and forth in the cross direction of the web by means of a device 13 suitable for this purpose, the device being preferably pneumatic, hydraulic or electrically driven. According to an embodiment of the invention the length of the reciprocating motion, i.e. the oscillation length, in both directions in the cross direction of the web 5 is arranged to be at least half the distance between the measurement orifices 7. Thus if the measurement orifices 7 are at a distance of 100 mm from one another, the measuring beam is moved from its normal basic position by at least 50 mm to both directions in the cross direction of the web 5. The basic position is the position of the tension measuring beam 1 in the cross direction of the web when the device 13 that moves the tension measuring beam 1 back and forth is not active. The movement of each measurement orifice 7 in relation to the web 5 thus forms a measurement path 14 shown in FIG. 4. For the sake of clarity, FIG. 4 does not show the frame 2 of the tension measuring beam 1 and the supports 4. If the diameter of the measurement orifices 7 is for example 2 mm, as above, the distance between the center points 100 mm and the sampling interval for the measurement 50 ms, then by setting the speed of the reciprocating movement at 40 mm/s, one measurement result is obtained for each 2 mm wide area of the web 5 in 2.5 seconds. This allows the tension profile of the web 5 to be measured on the entire width of the web 5 in 2.5 seconds. Another way to implement the reciprocating motion of the tension measuring beam 1 in a situation corresponding to the above example is such that the tension measuring beam 1 moves from its basic position by at least 100 mm to one direction only and then returns to the basic position. If a tension profile measurement covering only a part of the web 5 width is sufficient, the length of the oscillation length can be set shorter than in the above settings.

In the example of FIGS. 1 to 4, the tension measuring beam 1 comprising the frame 2 and the measuring bar 3 thus forms a measuring element that is moved back and forth in the cross direction of the web 5. However, the solution of the invention can also be implemented by supporting the tension measuring beam 1 fixedly to its location, while the measuring bar 3 is movably supported to the frame 2 of the tension measuring beam 1 such that the measuring bar 3 is allowed to move back and forth in the cross direction of the web 5. In other words, in this case the measuring bar 3 alone forms the measuring element moving back and forth in the cross direction of the web 5. The measuring bar 3 forms a measuring element moving back and forth in the cross direction of the web 5 also when the measuring bar 3 is provided with a structure which is so strong that the frame 2 of the measuring beam 1 can be entirely left out and the measuring bar 3 can be supported directly to the supports 4.

Measurement of web 5 tension according to the present solution thus enables to increase the resolution of the measurement in the cross direction of the web 5 without increasing the number of measurement sensors or other measuring devices, thereby allowing the measurement of the tension profile of the web 5 to be implemented either on the entire width of the web 5 or at least on a part of the web 5 width in an easy and simple manner. With precise tension profile measurement the speeds of the operational groups of the web processing unit and thus the tension of the web 5 can be adjusted to be optimal. When the entire tension measuring beam 1 is made to move back and forth in the cross direction of the web 5, extremely small changes in the structure of the tension measuring beam 1 and the associated measuring devices and in the control and data processing units are sufficient to implement the solution. The length of the back and forth motion, i.e. the oscillation length, can be selected on the basis of the distance between the measuring devices arranged to the measuring bar 3, whereby the number of sensing elements needed may be decreased, when desired, by increasing the oscillation length length. The reliability of the measurement can be further improved by determining an average for a plural number of separate tension profiles in the control and data processing unit 12. Moreover, the moving of the tension measuring beam 1 or the measuring bar 3 back and forth does not cause problems in the running of the web 5 or in its control, because the air cushion 6 is always between the web 5 and the guide surface GS, i.e. the web 5 is always kept apart from the guide surface GS.

In an embodiment of the invention, at the device 13 moving the tension measuring beam 1 back and forth or at the tension measuring beam 1 there is provided a position sensor 15, which measures a position P or a location P of the tension measuring beam 1 relative to the supports 4. The position sensor 15 may be an LVDT sensor, for example. On the basis of the position data P of the tension measuring beam 1 measured by the position sensor 15, each measurement data element representing the tension of the web 5 can be accurately synchronized with a specific point in the cross direction of the web 5, whereby the requirements set for the precision at which the device 13 moving the tension measuring beam 1 back and forth is to operate, for example the precision of the oscillation rate applied, can be reduced. Further, the tension measuring beam 1 can be provided with position sensors measuring the position of the edge of the web 5 to enable the measurement to be accurately aligned in the cross direction of the web 5.

The drawings and related specification are only intended to illustrate the idea of the invention. The details of the invention may vary within the scope of the claims.

That which is claimed:

1. A method for measuring the tension of a moving web, in which method the tension of the moving web is measured by a measuring element provided with a guide surface which the moving web is guided to pass such that the web forms an air cushion of the air it carries between the web and the guide surface and in which method a variable representing the tension of the moving web is measured by measuring devices arranged in connection with the measuring element, at a distance from one another in the cross direction of the web, the method comprising:
moving the measuring element back and forth in the cross direction of the web such that the tension profile of the web is measured at least on a part of the web width by the measuring devices arranged in connection with the measuring element.

2. A method according to claim 1, comprising: moving the measuring element back and forth in the cross direction of the web such that the tension profile of the web is measured on the entire width of the web by the measuring devices arranged in connection with the measuring element.

3. A method according to claim 1, wherein the measuring element is a tension measuring beam having a frame and a measuring bar, the measuring bar being provided with a guide surface facing the surface of the web.

4. A method according to claim 1, wherein the measuring element is a measuring bar provided with a guide surface facing the surface of the web.

5. A method according to claim 1, comprising: measuring a position of the measuring element to determine the position of the measuring element in relation to supports of the measuring element.

6. A method according to claim 1, wherein the variable representing the tension of the web is the pressure of the air cushion between the web and the guide surface of the measuring element.

7. A method according to claim 1, wherein the length of the reciprocating movement of the measuring element in the cross direction of the web in both directions from the basic position of the measuring element is at least half the distance between the measuring devices arranged to the measuring element.

8. A method according to claim 7, wherein the distance between the measuring devices in the measuring element is 10–300 mm.

9. A method according to claim 1, wherein the moving web is a paper, paperboard or tissue web.

10. Equipment for measuring the tension of a moving web, the equipment comprising
a measuring element provided with a guide surface which the moving web is arranged to pass such that the moving web forms an air cushion of the air it carries between the web and the guide surface,
measuring devices arranged in connection with the measuring element at a distance from one another in the cross direction of the web for measuring a variable representing the tension of the moving web, and
a device which is arranged to move the measuring element back and forth in the cross direction of the web such that the tension profile of the web is arranged to be measured at least on a part of the web width by the measuring devices arranged in connection with the measuring element.

11. Equipment according to claim 10, wherein the device is arranged to move the measuring element back and forth in the cross direction of the web such that the tension profile of the web is arranged to be measured on the entire width of the web by the measuring devices arranged in connection with the measuring element.

12. Equipment according to claim 10, wherein the measuring element is a tension measuring beam having a frame and a measuring bar, the measuring bar being provided with a guide surface facing the surface of the web.

13. Equipment according to claim 10, wherein the measuring element is a measuring bar provided with a guide surface facing the surface of the web.

14. Equipment according to claim 10, wherein the equipment further comprises a position sensor for measuring a position of the measuring element in relation to supports of the measuring element.

15. Equipment according to claim 10, wherein the variable representing the tension of the web is the pressure of the air cushion between the web and the guide surface of the measuring element.

16. Equipment according to claim 10, wherein the length of the reciprocating movement of the measuring element in the cross direction of the web is in both directions from the basic position of the measuring element at least half the distance between the measuring devices arranged to the measuring element.

17. Equipment according to claim 16, wherein the distance between the measuring devices in the measuring element is 10–300 mm.

18. Equipment according to claim 10, wherein the moving web is a paper, paperboard or tissue web.

* * * * *